US012481421B2

(12) United States Patent
Sharma et al.

(10) Patent No.: US 12,481,421 B2
(45) Date of Patent: Nov. 25, 2025

(54) INTERACTIVE GEOGRAPHICAL MAP FOR MANAGEMENT OF COMPUTING RESOURCES

(71) Applicant: Oracle International Corporation, Redwood Shores, CA (US)

(72) Inventors: Sourabh Sharma, Pune (IN); Cheng Cheng, Santa Clara, CA (US); Shailesh Dwivedi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 127 days.

(21) Appl. No.: 18/487,616

(22) Filed: Oct. 16, 2023

(65) Prior Publication Data

US 2025/0123735 A1    Apr. 17, 2025

(51) Int. Cl.
*G06F 3/04847* (2022.01)
*G06F 9/451* (2018.01)

(52) U.S. Cl.
CPC .......... *G06F 3/04847* (2013.01); *G06F 9/451* (2018.02)

(58) Field of Classification Search
CPC .. G06F 3/04847; G06F 3/048; G06F 11/3055; G06F 11/3006; G06F 11/328
See application file for complete search history.

(56) References Cited

U.S. PATENT DOCUMENTS

| 5,270,919 A * | 12/1993 | Blake ............... H04L 41/145 |
| | | 379/136 |
| 9,258,195 B1 * | 2/2016 | Pendleton .......... H04L 67/75 |
| 9,852,139 B1 * | 12/2017 | Chepa ............. H04L 67/1095 |
| 2015/0121122 A1 * | 4/2015 | Towstopiat ...... G06F 11/1471 |
| | | 714/4.11 |

* cited by examiner

*Primary Examiner* — Jeanette J Parker
(74) *Attorney, Agent, or Firm* — Invoke

(57) ABSTRACT

Techniques for presenting a graphical user interface (GUI) for configuring a distributed resource instance are disclosed. The system presents an interactive GUI displaying a geographical map and displays a plurality of user interface (UI) elements overlaid on the geographical map, each respective UI element respectively corresponding to a respective computing resource of plurality of computing resources. The system displays the respective UI element at a position on the geographical map that corresponds to a geographical location of physical hardware being used to implement the respective computing resource. The system receives a first user input selecting a first UI element of the plurality of UI elements; and responsive to receiving the first user input selecting the first UI element: identifies a first computing resource corresponding to the first UI element; and presents a first resource configuration GUI that displays a set of configurable attributes associated with the first computing resource.

28 Claims, 12 Drawing Sheets

Configure Shards

Regions and count — 502

| Selected region | Shardspace count |
|---|---|
| us-ashburn-1 | 2 |
| uk-london-1 | 1 |
| ap-mumbai-1 | 1 |

501

☐ Apply same settings to all shards

| Shardspace name | ECPU count | ECPU auto scaling | Storage (GB) | Primary VM cluster | Enable Data Guard | Data Guard region | Data Guard VM cluster |
|---|---|---|---|---|---|---|---|
| eaq_IAD_1 | 2 | ◯ | 32 | ATP-D Cluster | ◯ | US East (Ashburn) | ATP-D Cluster |
| eaq_IAD_2 | 2 | ◯ | 32 | ATP-D Cluster | ◯ | Select Region | Select Cluster |
| eaq_LHR_2 | 2 | ◯ | 32 | ATP-D Cluster_QA_01_LHR | ◯ | Select Region | Select Cluster |
| eaq_BOM_3 | 2 | ◯ | 32 | ATP-D Cluster_QA_01_BOM | ◯ | Select Region | Select Cluster |

INTERACTIVE GEOGRAPHICAL MAP FOR MANAGEMENT OF COMPUTING RESOURCES

TECHNICAL FIELD

The present disclosure relates to interactive graphical user interfaces for creating and configuring a set of geographically distributed computing resources. In particular, the present disclosure relates to presenting a geographic map with selectable elements representing computing resources at respective geographic locations, and graphical user interfaces to add, modify and delete computing resources.

BACKGROUND

A distributed database may include a logical database that distributes segments of the entire dataset across many physically separate databases (sometimes referred to as "shards") on different computers, on a tenant's premises or in a cloud system. The individual shards of a distributed database are typically separate from each other, each with their own respective hardware or software computing resources. Furthermore, the data in one shard may be different from the data in the other shards in the logical database. Some shards may be used as backup shards to a primary shard, either in the same location as the primary shard or in a different location. Changes made to the data in the primary shard are automatically propagated to the backup shard. If a primary shard becomes unavailable, then the backup shard is configured as the primary shard at least until the previous primary shard is available again. From the perspective of a database administrator, a sharded database includes multiple databases that can be managed collectively. Creating and managing the different shards within a logical database can be complicated, time consuming and error prone.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5 illustrates a GUI for configuring a set of distributed computing resources in accordance with one or more embodiments;

DETAILED DESCRIPTION

Figure 1:
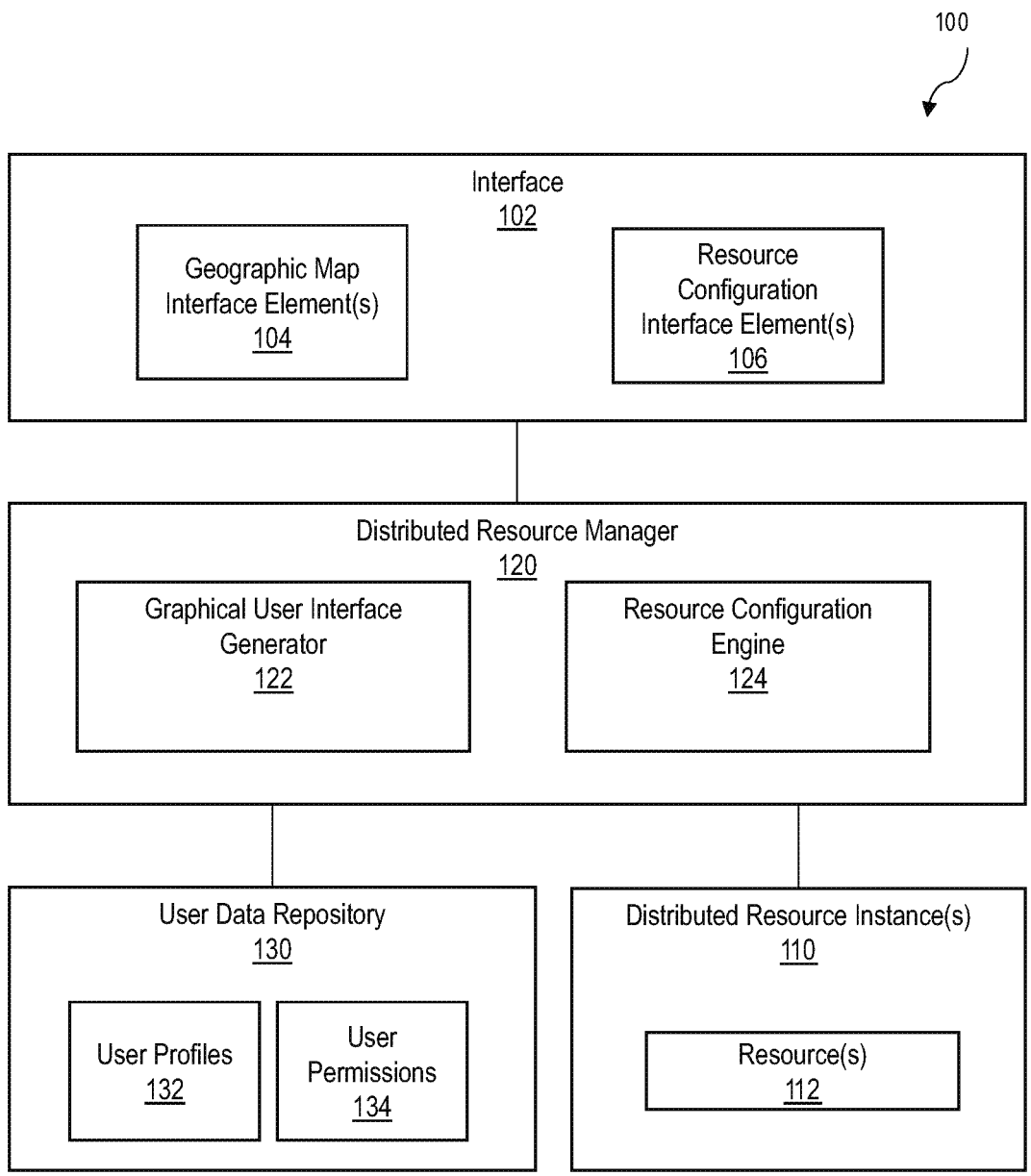
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present disclosure.

1. GENERAL OVERVIEW
2. DISTRIBUTED COMPUTING RESOURCE MANAGEMENT ARCHITECTURE
3. DISPLAYING AND UPDATING A GUI FOR CONFIGURING A COMPUTING RESOURCE
4. EXAMPLE EMBODIMENT
5. PRACTICAL APPLICATIONS, ADVANTAGES, AND IMPROVEMENTS
6. COMPUTER NETWORKS AND CLOUD NETWORKS
7. HARDWARE OVERVIEW
8. MISCELLANEOUS; EXTENSIONS

1. General Overview

One or more embodiments include a geographical map-based interactive graphical user interface that allows the user to create, modify, and remove computing resources from a system of geographically distributed computing resources. The system of geographically distributed computing resources may be, for example, a distributed database system, where the data in the database system is divided among different locations.

In one or more embodiments, the graphical user interface displays a geographical map and user interface elements overlaid at different locations on the geographical map. Each displayed user interface element corresponds the location of physical hardware being used to implement a particular computing resource of plurality of computing resources at the geographical location. When a user selects a user interface element, the system identifies a computing resource corresponding to the user interface element and presents a resource configuration graphical user interface that displays a set of configurable attributes associated with the computing resource.

The user may modify one or more of the configurable attributes for the computing resource in the resource configuration graphical user interface. For example, the user may add a computing resource to the geographical location, change an amount of storage used by the computing resource, create and connect a backup computing resource, or delete a computing resource in the resource configuration graphical user interface.

The system presents a resource configuration graphical user interface and receives user input modifying a value of a configurable attribute. Responsive to the user input, the system modifies the value of the configurable attribute for the computing resource. Changes made in the resource configuration graphical user interface can then be reflected in the display of the geographical map.

In one or more embodiments, the graphical user interface allows a user to initiate the creation of computing resources, e.g., a distributed database system. The graphical user interface displays a geographical map and a plurality of user interface elements overlaid on the geographical map. Each particular user interface element respectively corresponds to a geographical location of physical hardware available for use in implementing a computing resource. In some embodiments, the system detects, at runtime, a set of database resources requested by a user interacting with the geographical map. The system determines, based on the set of database resources, a set of candidate geographical locations having physical computing resources available to implement the requested set of database resources. Thereafter, the system presents, on the geographical map, selectable user interface elements for the geographical locations in the set of candidate geographical locations. The system may refrain from presenting any selectable user interface elements for geographical locations that do not have physical computing resources available for implementing the requested set of database resources.

The system receives a user input selecting a user interface element and, in response, presents a computing resource creation graphical user interface configured to receive user input to create a computing resource. When the system receives user input to create a computing resource, the system presents, in the computing resource creation GUI, a set of configurable attributes associated with a computing resource available at the geographical location corresponding to the selected user interface element. The system receives additional input selecting a configuration of the set of configurable attributes, and in response, implements the computing resource on a set of physical hardware located at the geographical location. The system updates the geographical map to display an indication, at the selected user interface element, that the computing resource is created.

Within the computing resource creation graphical user interface, the system can receive user input to add a second computing resource at the geographical location, and in response, the system presents, in the computing resource creation graphical user interface, a set of configurable attributes associated with a second computing resource available at the geographical location corresponding to the selected user interface element. Upon receiving additional user input selecting a configuration of the set of configurable attributes, the system implements the additional computing resource on the set of physical hardware located at the geographical location. The system updates the geographical GUI to display an indication, at the selected user interface element, of a number of computing resources active at the geographical location.

One or more embodiments described in this Specification and/or recited in the claims may not be included in this General Overview section.

2. Distributed Computing Resource Management Architecture

FIG. 1 illustrates a system 100 in accordance with one or more embodiments. As illustrated in FIG. 1, system 100 includes an interface 102, a distributed resource instance 110, a distributed resource manager 120, and a user data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, interface 102 refers to hardware and/or software configured to facilitate communications between a user and the distributed resource manager 120. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

Interface 102 may present one or more geographic map interface elements 104. Geographic map interface elements 104 may include a geographic map, for example, an outline of one or more continents, countries, states, counties, cities, or other geographic designations. Geographic map interface elements 104 may include selectable elements, displayed on a geographic map, that correspond to respective specific geographic locations. The selectable elements may be, for example, radio buttons, checkboxes, or any other element that can toggle visually between a selected state and an unselected state. The selectable elements may include a text label indicating the corresponding location. Geographic map interface elements 104 may include visualizations that represent a relationship between two other elements. Geographic map interface elements 104 may include selectable elements that cause other GUI elements to be displayed when selected by a user. Examples of geographic map interface elements 104 are shown and described with reference to FIGS. 3, 4, 6, and 10-11.

Interface 102 may present one or more resource configuration interface elements 106. A resource configuration interface element 106 may present information about a computing resource present at a geographical location, including one or more configurable attributes of the computing resource, and may allow a user to add, modify or delete a computing resource. Examples of resource configuration interface elements 106 are shown and described with reference to FIGS. 5, and 7-9.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

A distributed resource instance 110 (also referred to herein as a distributed computing resource instance) may be a distributed database. The distributed resource instance 110 may be a logical database that distributes segments of the entire dataset across many physically separate databases (sometimes referred to as "shards") at different geographical locations. The individual shards of a distributed database may be stored on respective individual computing resources 112. A computing resource 112 may include the physical hardware, software, and networking computing resources at one geographical location that supports the integration of an individual shard into the larger distributed resource instance 110. The hardware and software components can include one or more compute shapes, storage components, network components, and operational instructions to interact with the computing resource 112. A compute shape includes one or more processing components, memory, and any other processing resources used to execute the functionality of the distribute computing resource system. A storage component includes volatile and/or nonvolatile computer readable memory devices that store data. A network resource may include one or more communication channels, network software, and/or hardware that the distributed computing resource may use to send or receive data between computing resources, or to other networks.

In one or more embodiments, the distributed resource manager 120 refers to hardware and/or software configured to perform operations described herein for creating and managing computing resources in a set of distributed computing resources via a graphical user interface. Examples of operations for creating and managing computing resources in a set of distributed computing resources via a graphical user interface are described below with reference to FIG. 2.

The distributed resource manager 120 may include one or more functional components, such as a graphical user interface generator 122 and a resource configuration engine 124. The graphical user interface generator 122 may generate and/or select interface elements 104 and 106 and present them on the interface 102.

The resource configuration engine 124 may receive information from the GUI elements 104 and 106 via the GUI generator 122. The resource configuration engine 124 may perform operations on a distributed resource instance, such as a distributed resource instance 110, based on the received information. The operations may include implementing a computing resource 112 on physical hardware housed at a geographical location. The operations may further include setting or modifying one or more configurable attributes of the computing resource. The operations may further include removing a computing resource from the distributed resource instance; and/or changing a location of a computing resource.

The resource configuration engine 124 may provide information to the GUI generator 122 about the computing resources 122 for use in rendering the interface elements. For example, the resource configuration engine 124 may provide information about a number of computing resources at a geographical location, settings of configurable attributes for a computing resource, performance statistics about a computing resource, a state or status of a computing resource, or a relationship between computing resources. The resource configuration engine 124 may provide an interface for applications to access and use the distributed resource instance.

Prior to creating and using a distributed resource instance, a user may need to obtain a set of computing resources, for example, by creating an account with an entity providing the distributed resource instance and purchasing or reserving computing resources. Obtaining the set of computing resources does not yet allocate any specific computing resources to the user, but rather indicates what quantities and configurations the user will be allowed to use. The user's account information and information about the set of computing resources obtained by the user may be stored in a user profile 132. User permissions 134 may store settings related to what computing resources a user may access and what type of access the user has to those computing resources. For example, the user may be permitted to access computing resources in North America, and may be able to read from a computing resource, but may not be able to write to or otherwise modify a computing resource.

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or executed on the same computing system as distributed resource manager 120. Alternatively, or additionally, a data repository 130 may be implemented or executed on a computing system separate from distributed resource manager 120. The data repository 130 may be communicatively coupled to distributed resource manager 120 via a direct connection or via a network. Additional embodiments and/or examples relating to computer networks are described below in Section 6, titled "Computer Networks and Cloud Networks."

Information describing the user profiles and user permissions may be implemented across any of components within the system 100. However, this information is illustrated within the data repository 130 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. Displaying and Updating a Gui for Configuring a Computing Resource

Figure 2:
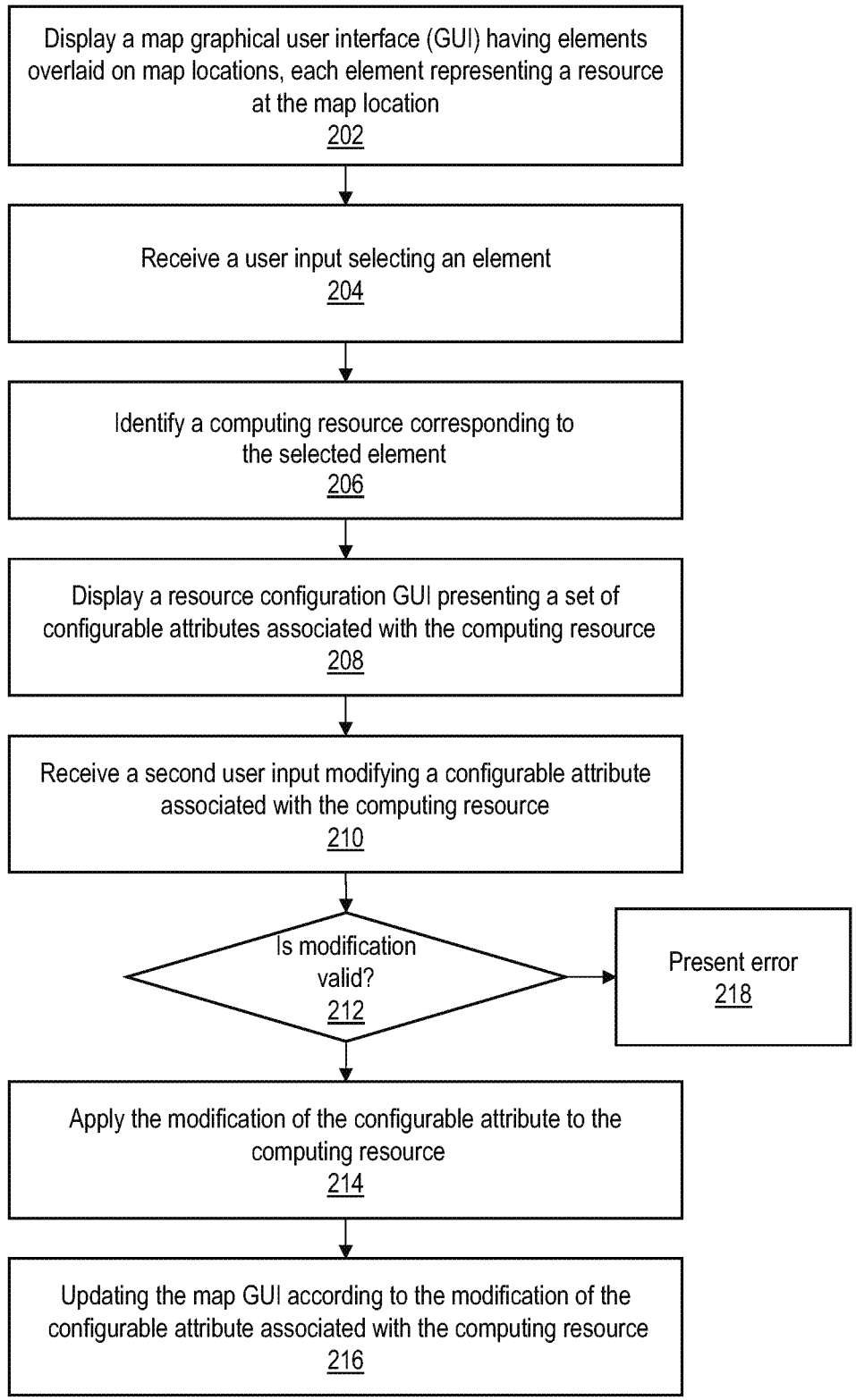
FIG. 2 illustrates an example set of operations for presenting an interactive graphical user interface (GUI) for configuring a set of distributed computing resources in accordance with one or more embodiments.

FIG. 2 illustrates an example set of operations for configuring computing resources in a set of distributed computing resources via a graphical user interface in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In one or more embodiments, the system displays a map graphical user interface (GUI) having elements overlaid on map locations, each element representing a computing resource at the map location (Operation 202). The system may determine geographic locations of one or more existing computing resources in a user's distributed resource instance, e.g., shards of a distributed database system. The system may render a geographic map on a display and place selectable user interface elements on the map at positions corresponding to the location(s) of the user's computing resources.

In one or more embodiments, the system receives a user input selecting an element (Operation 204). The user may use an input device such as a mouse or trackpad to move a cursor to a selectable element and then select the element with a button on the input device. Alternatively, the user may use a keyboard to navigate among the displayed elements and may select an element with the enter/return key. The system may update the selected element to indicate a selected state, for example, by changing a color or shading of the element, adding a checkmark, or some other visual indication of selection.

In one or more embodiments, the system identifies a computing resource corresponding to the selected element (Operation 206). The selected element may be mapped to a location within the distributed resource instance. The system may identify which location corresponds to the selected element and may determine what computing resources the user has at the identified location. The system may retrieve the settings of configurable attributes of the computing resource.

In one or more embodiments, the system displays a resource configuration GUI presenting a set of configurable attributes associated with the computing resource (Operation 208). The system may present individual user interface elements for each configurable attribute of the computing resource. Each individual user interface element may show a current value for the configurable attribute based on the values retrieved by the system. The individual user interface elements are configured to allow the user to modify the value for a configurable attribute.

In one or more embodiments, the system receives a second user input modifying a configurable attribute associated with the computing resource (Operation 210). The system may receive input from a keyboard, mouse or other input device interacting with an interface element. For example, some interface elements may allow the user to type in any set of characters to change a value for the associated configurable attribute. Other interface elements may allow the user to select from a set of acceptable and/or available values for the configurable attribute. Still other interface elements may allow the user to select or deselect a value for a configurable attribute.

In one or more embodiments, the system determines whether the modification is valid (Operation 212). For example, if the user changes the name of a computing resource, the system may check that the name is unique within the set of computing resources in the user's distributed resource instance, and/or that the name includes only allowable characters. If the user changes a number or amount of a hardware component used by the computing resource, the system may check that the user has access to the selected number or amount based on the user profile and whether the corresponding geographical location has a sufficient number or amount of the hardware component to allocate to the computing resource. The system may check whether an allocation rule is being followed, such as a rule that sets a ratio of how much data storage to allocate per processing unit.

When a modification is not valid, the system may present an error indicating a validation failure (Operation 218). The system may present information explaining the failure and may provide additional information to allow the user to change a setting to an allowed value. Alternatively, or additionally, the system may change a failed setting to an allowable value.

In one or more embodiments, when the modification is valid, the system applies the modification of the configurable attribute to the computing resource (Operation 214). For example, if the modification consists of adding one or more hardware components, for example, allocating additional data storage, the system implements the additional hardware components from available components at the geographical location and connects the additional components to the existing computing resource. If the modification consists of adding a backup computing resource for an existing computing resource, the system implements the backup computing resource in the hardware at a selected location and connects the backup computing resource to the existing computing resource such that data is automatically copied to the backup computing resource. The system may update a catalog, if one exists, for the distribute computing resource instance. A catalog serves as a metadata repository that stores information about the structure and organization of the data within a database. The catalog provides a centralized source of information about the database schema.

In one or more embodiments, the system updates the map GUI according to the modification of the configurable attribute (Operation 216). For example, if the modification consists of adding a backup computing resource for an existing computing resource at a second location, the system may update the map by adding an interface element at the second location with an indication of the existence of the backup computing resource. If the modification consists of adding a computing resource to the same location, the system may update the interface element at the same location to show the updated number of computing resources at the location.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

A. Creating a Computing Resource

Figure 3:
FIGS. 3 and 4 illustrate GUIs for creating a set of distributed computing resources in accordance with one or more embodiments.

FIG. 3 illustrates a GUI 300 that may be presented prior to creation of a distributed resource instance. The GUI 300 includes a geographical map 302. The GUI 300 includes selectable user interface elements 304*a*, 304*b*, 304*c*, and 304*d*. Each element 304 corresponds to a geographical location. In the illustrated example, each of the elements 304 is in an unselected state.

The system may determine a set of locations at which to display the elements 304, for example, by determining from the user profile what set of computing resources the user has obtained. Based on the obtained set of computing resources, the system can determine which locations have available computing resources and may display the elements 304 at those locations.

Figure 4:
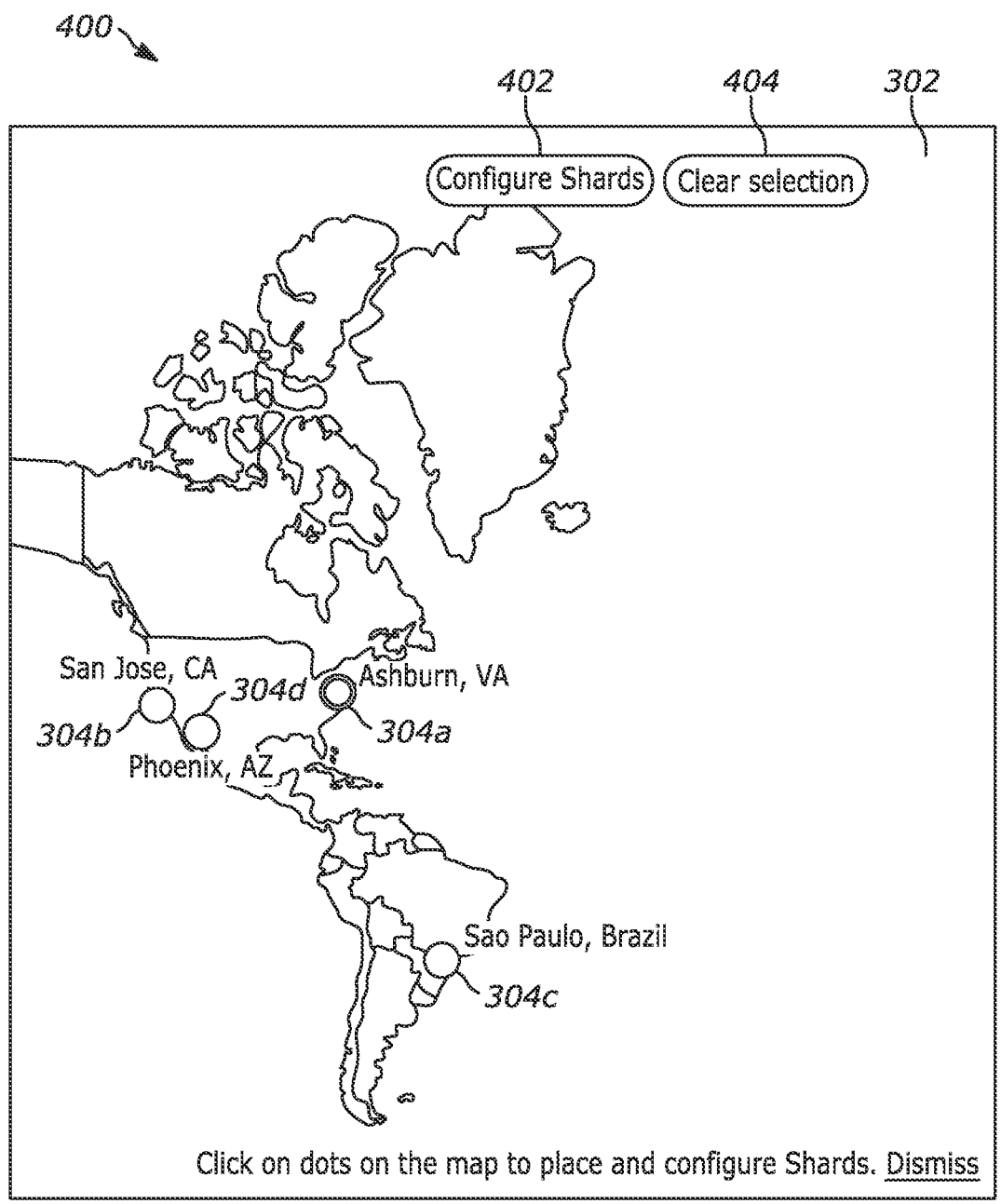

FIG. 4 illustrates a GUI 400 that may be presented once a user has selected one or more of the selectable user interface elements 304*a*, 304*b*, 304*c*, and 304*d*. In the illustrated example, the user has selected element 304a. In response to the selection, the system presents a configuration-initiation interface element 402 and a clear selection interface element 404. When selected, the configuration-initiation interface element 402 causes the system to present a resource configuration GUI. The clear selection interface element 404, when selected, causes the system to revert any selected interface elements 304 to an unselected state and remove the elements 402 and 404 from the GUI 400.

FIG. 5 illustrates an example of a resource configuration GUI 500. In the illustrated example, the GUI 500 includes a section 501 that presents a row for each geographic location corresponding to interface elements selected on the geographic map, i.e., a row for computing resources in Ashburn, a row for computing resources in London, and a row for computing resources in Mumbai. Section 501 includes elements 502 that allow the user to change how many computing resources to implement at each of the locations. As illustrated, the Ashburn location has two computing resources, while London and Mumbai each have one.

The GUI 500 includes a section 503 where the user can set the values for configurable attributes for each computing resource. As illustrated, section 503 includes a row for each of the two computing resources in Ashburn, and one row each for the computing resources in London and Mumbai. If the user were to change the number of computing resources at a location in section 501, a row would be added or removed accordingly in section 503. Column 504 shows a unique name for each computing resource. The user may modify the name of a computing resource within a field in column 504. Column 506 shows a number of processing units assigned to the computing resource. The user may increase or decrease the number. Column 508 provides a toggle switch for each computing resource that determines whether the number of processing units can be automatically scaled by the system if needed. Column 510 shows of data storage capacity for each computing resource, which the user can modify. Column 512 identifies a primary virtual machine (VM) cluster that will be used by the computing resource. When more than one VM cluster is possible, the user may select from the available options. Column 514 provides a toggle switch for each computing resource that determines whether a backup computing resource will be created for the computing resource. As illustrated, the first of the two Ashburn computing resources has the backup computing resource enabled. Column 516 allows the user to select the location of the backup computing resource, when the toggle switch in column 514 is on. Column 518 allows the user to select which backup VM cluster to use for the backup computing resource, when the toggle switch in column 514 is on.

In one or more embodiments, the system may validate a value of a configurable attribute whenever the user makes a change in one of the columns. For example, if the user changes a computing resource name, the system may check that the name is unique within the set of computing resources in the user's distributed resource instance. If the user changes the number of processing units in column 506, the system may check that the user has access to the selected number based on the user profile and whether the location has a sufficient number of processing units to allocate to the computing resource. Similarly, if the user changes the amount of storage capacity in column 510, the system may check that the user is allowed to use the selected amount and that the location has sufficient supply. The system may check whether an allocation rule is being followed, such as a rule that sets a ratio of how much data storage to allocate per processing unit. If any of these checks fails, the system may present information indicating a validation failure, and may provide additional information to allow the user to change a setting. Alternatively, or additionally, the system may change a failed setting to an allowable value.

The user may save or accept the settings of the configurable attributes. The system may then use the settings to implement the computing resources on physical hardware at the selected geographical locations.

Example Set of Operations

In one or more embodiments, one or more non-transitory computer readable media comprise instructions which, when executed by one or more hardware processors, causes performance of operations comprising: presenting a Graphical User Interface (GUI) displaying a geographical map; displaying a plurality of user interface elements overlaid on the geographical map, each particular user interface element, of the plurality of user interface elements, respectively corresponding to a geographical location of physical hardware available for use in implementing a computing resource; receiving a first user input selecting a first user interface element of the plurality of user interface elements; and responsive to receiving the user input selecting the first user interface element: presenting a computing resource creation GUI configured to receive a second user input to create a computing resource; responsive to receiving the second user input to create a computing resource, presenting, in the computing resource creation GUI, a set of configurable attributes associated with a first computing resource available at the geographical location corresponding to the first user interface element; receiving a third user input selecting a configuration of the set of configurable attributes; implementing the computing resource on a set of physical hardware located at the geographical location; and updating the geographical map GUI to display an indication, at the first user interface element, that the first computing resource is created.

The operations may further comprise: receiving a fourth user input in the computing resource creation GUI to add a second computing resource at the first geographical location; responsive to receiving the fourth user input to create a computing resource, presenting, in the computing resource creation GUI, a set of configurable attributes associated with a second computing resource available at the geographical location corresponding to the first user interface element; receiving a fifth user input selecting a configuration of the set of configurable attributes; and updating the geographical GUI to display an indication, at the first user interface element, of a number of computing resources active at the first geographical location.

B. Configuring an Existing Computing Resource

Figure 6:
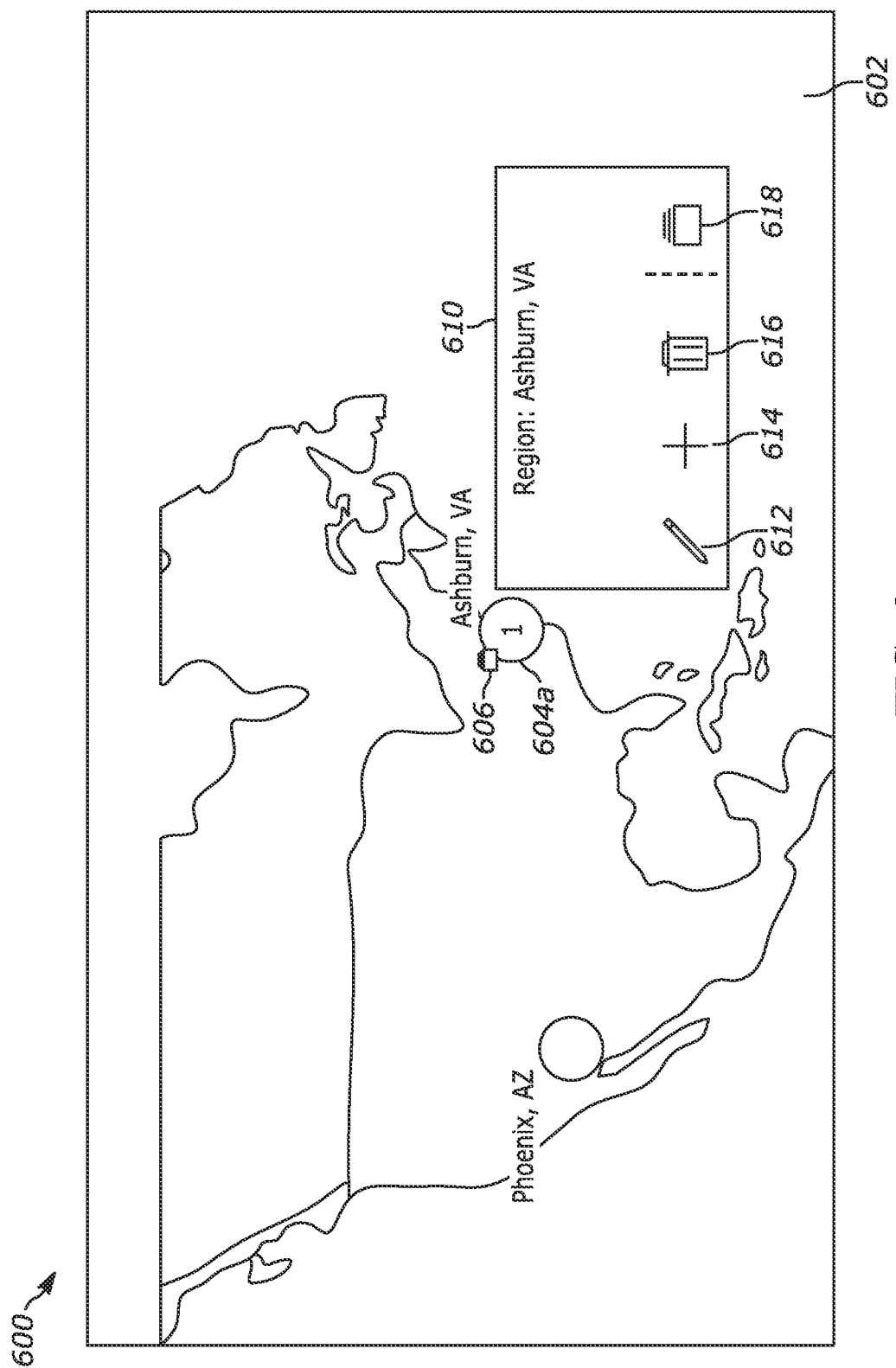
FIG. 6 illustrates a GUI for accessing a set of operations to modify a distributed computing resource in accordance with one or more embodiments.

FIG. 6 illustrates a GUI 600 that may be presented once at least one computing resource has been created in a distributed resource instance. The GUI 600 includes a geographic map 602. In the illustrated example, the selectable user interface element 604a includes an indication of the number of computing resources present at the geographic locations corresponding to the element 604a. As shown, one computing resource is present in Ashburn, Virginia. The GUI 600 includes element 606, which indicates that a catalog computing resource is present at the selected geographic location.

When a user selects the element 604a, for example by "clicking" the element with an input device, or by hovering an input device cursor over the element 604a, the system may present a computing resource modification GUI 610 overlaid on the geographical map 602. The computing resource modification GUI 610 may display a set of selectable options, for example, a modify option 612, an add option 614, a delete option 616, and a modify catalog option 618. If there is no catalog computing resource at the selected geographic location, then modify catalog option 618 may not be presented. Each option may be associated with a respective GUI operative to execute an operation on the computing resource.

Figure 7:
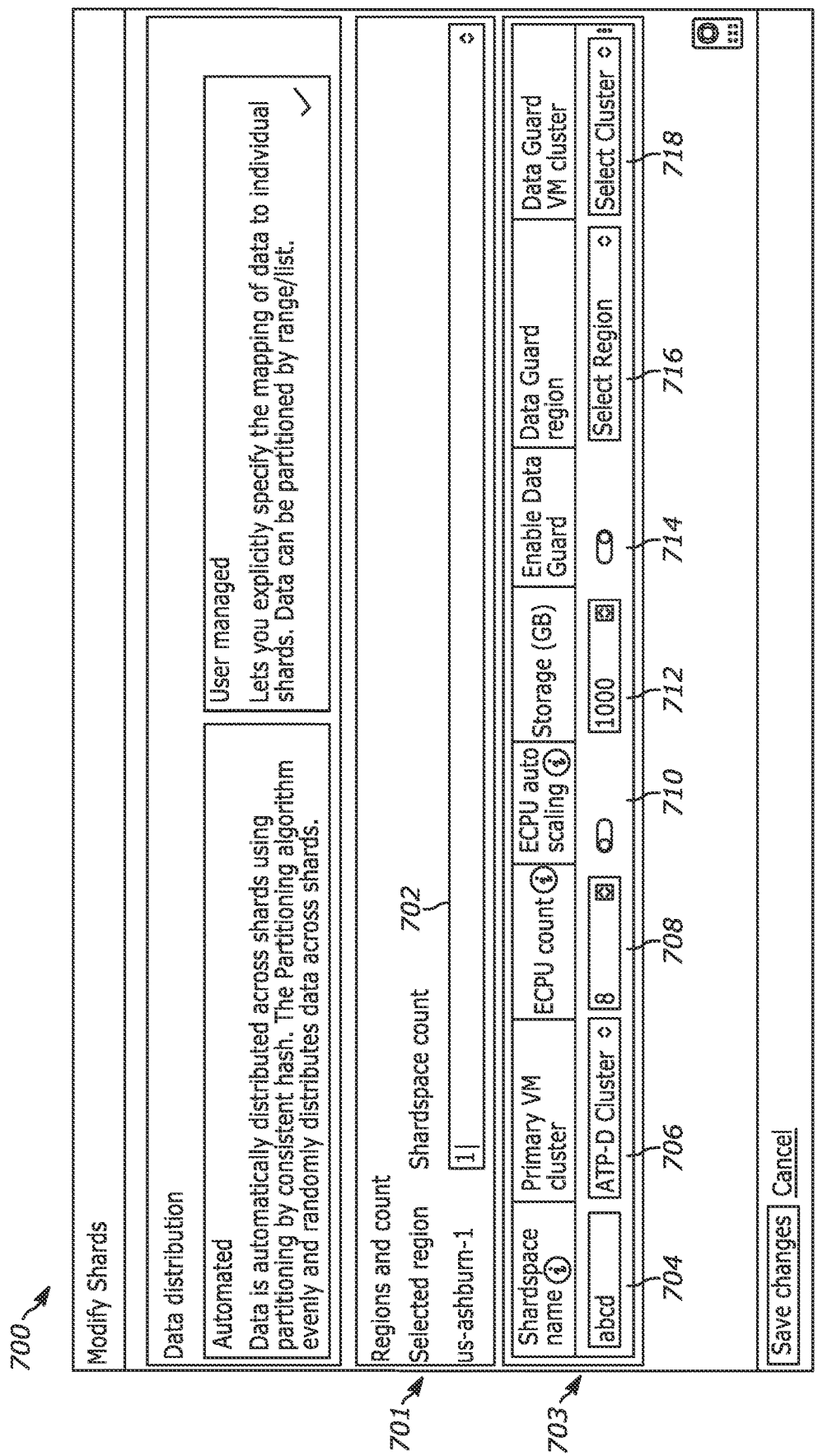
FIG. 7 illustrates a GUI for modifying a distributed computing resource in accordance with one or more embodiments.

For example, when the modify option 612 is selected, the system may present the GUI 700 illustrated in FIG. 7. GUI 700 may be the same or similar to the GUI 500. Accordingly, section 701 presents a row for each geographic location corresponding to interface elements selected on the geographic map. Because one location is selected in the GUI 600, for Ashburn, and because the Ashburn location has one computing resource, one row is shown in section 701. Section 701 includes an element 702 that allows the user to change how many computing resources to implement at the selected location.

The GUI 700 includes a section 703 where the user can set the values for configurable attributes for each computing resource. Column 704 shows the name for each computing resource. Column 706 shows the number of processing units assigned to the computing resource. Column 708 provides a toggle switch for each computing resource that determines whether the number of processing units can be automatically scaled by the system if needed. Column 710 shows of data storage capacity for each computing resource. Column 712 identifies a primary virtual machine (VM) cluster that will be used by the computing resource. Column 714 provides a toggle switch for each computing resource that determines whether a backup computing resource will be created for the computing resource. Column 716 allows the user to select the location of the backup computing resource, when the toggle switch in column 714 is on. Column 718 allows the user to select which backup VM cluster to use for the backup computing resource, when the toggle switch in column 714 is on. As with the GUI 500, the user may modify the values of at least some of the configurable attributes. The system may validate the modified values before the user is allowed to save the changes.

Figure 8:
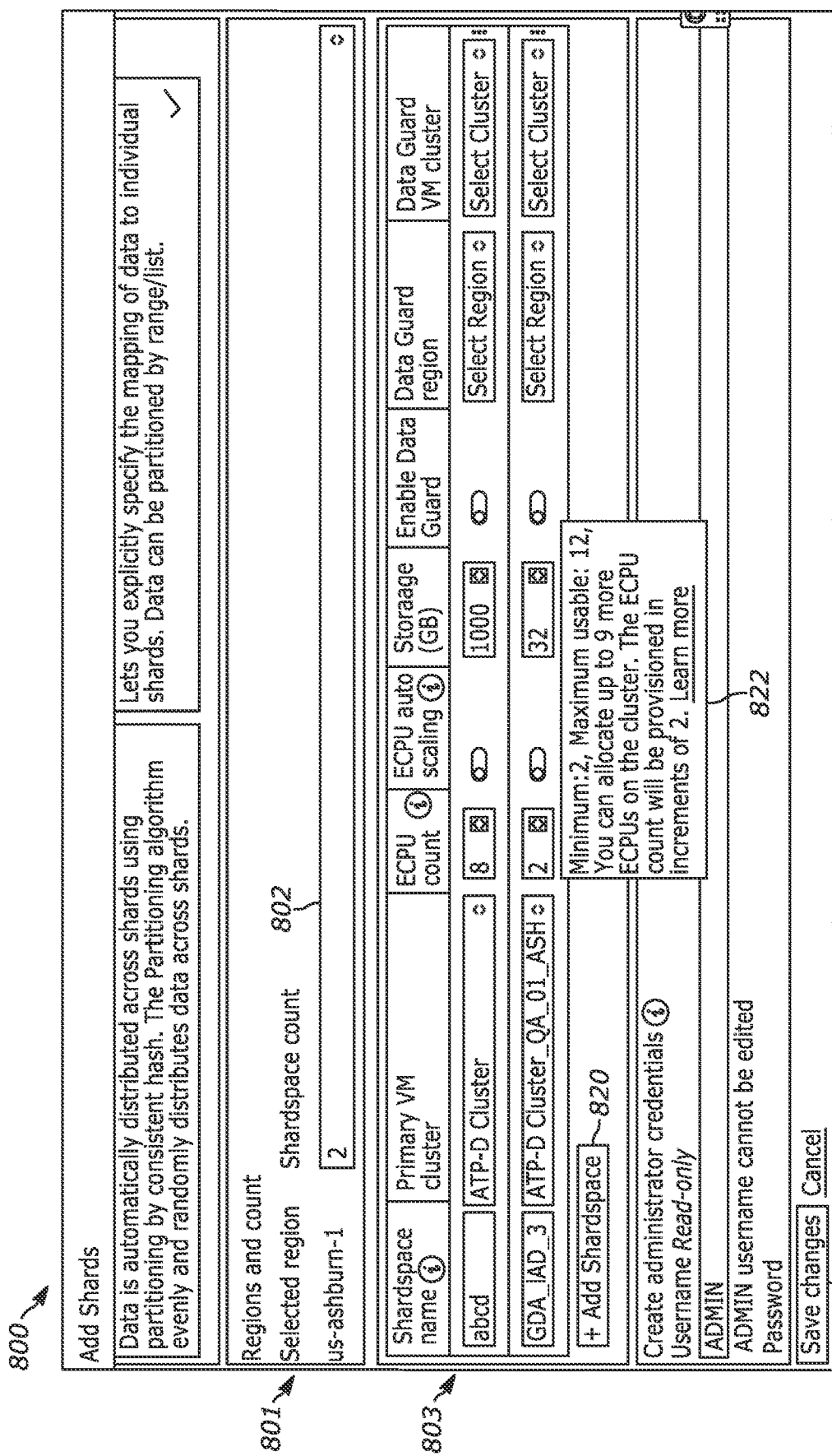
FIG. 8 illustrates a GUI for adding a distributed computing resource to a set of distributed computing resources in accordance with one or more embodiments.

When the add option 614 is selected, the system may present the GUI 800 illustrated in FIG. 8. The GUI 800 includes a section 801 that shows a row for each computing resource at the selected geographic location, and a field 802 where the user may change the number of computing resources at the geographic location. Section 803 shows a row for each existing computing resource and the values for the existing computing resource's configurable attributes. In one or more embodiments, the values for the existing computing resource's configurable attributes may not be modifiable in the GUI 800. When the user increases the number of computing resources in field 802, the system may display a new row in section 803 for each additional new computing resource. Alternatively, the user may add a new computing resource at the geographic location by selecting the button 820, which will add a row to section 803 and update the number in field 802. The user may then modify the values of the configurable attributes in the new row(s).

The system may validate each modification to a configurable attribute. Element 822 is an example of a warning or information panel that the system may present when the user tries to change the number of processing units to a value that is not permitted or available. Once the user is ready to create the new computing resource, the user can select the button 824 to save the changes. The system then implements the new computing resource at the corresponding geographic location based on the configurable attribute values. The geographic map is updated, for example, by showing that two computing resources are now present at the geographic location.

Figure 9:
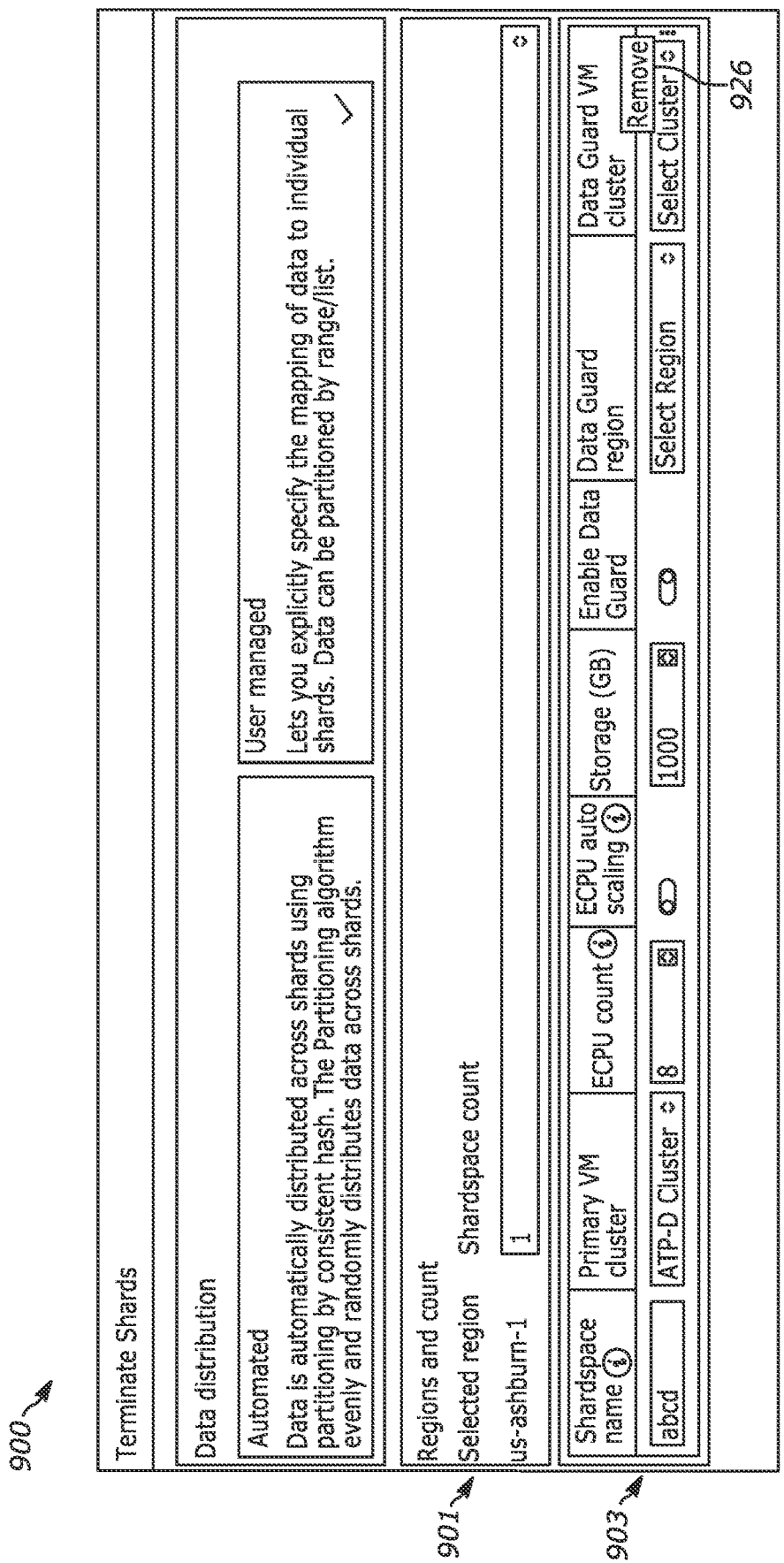
FIG. 9 illustrates a GUI for deleting a distributed computing resource in accordance with one or more embodiments.

When the delete option 616 is selected, the system may present the GUI 900 illustrated in FIG. 9. The GUI 900 includes a section 901 that shows a row for each computing resource at the selected geographic location. Section 903 shows a row for each existing computing resource and the values for the existing computing resource's configurable attributes. Section 903 presents a remove button 926 within the row for an existing computing resource's configurable attributes. When the user selects the remove button 926, the computing resource is removed from the system. In one or more embodiments, the system may present one or more confirmation dialogs to ensure that the user intends to delete the computing resource and the data stored thereon. Upon confirmation of the deletion, the system may update the database catalog to remove information about the computing resource, and may make the compute, network and storage infrastructure used by the computing resource available for use to other distributed resource instances.

C. Informative Display Elements

In one or more embodiments, the system detects, at runtime, a current relationship between a first computing resource and a second computing resource; and responsive to detecting the current relationship between the first computing resource and the second computing resource: generates and displays a visualization, overlaid on the geographical map, that represents the current relationship. For example, when the first computing resource is a primary storage computing resource and the second computing resource is a backup storage computing resource for the first computing resource, and the visualization can be an animation representing a transfer of data from the primary storage computing resource to the backup storage computing resource.

Figure 10:
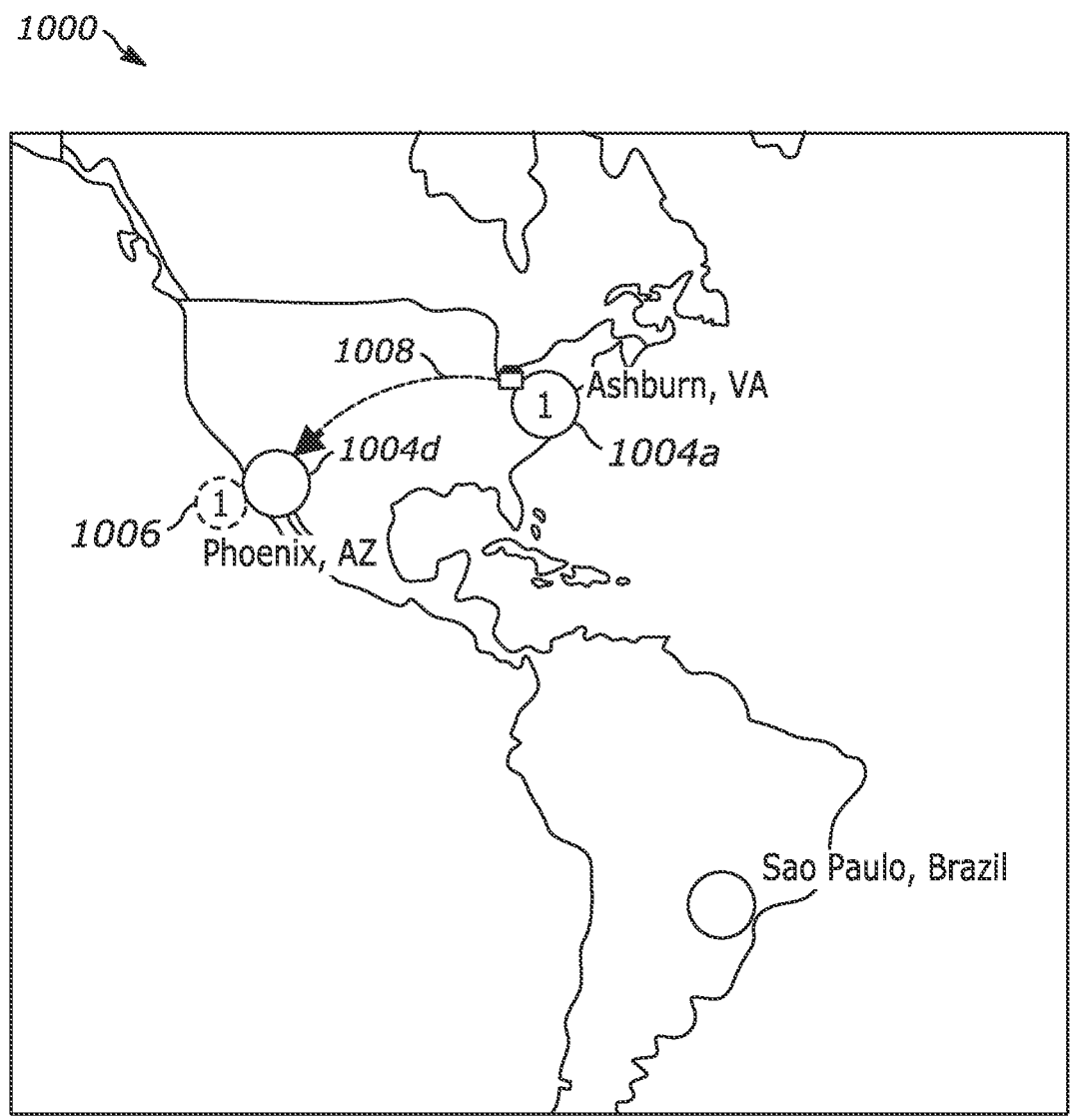
FIG. 10 illustrates an GUI that displays a visualization of a relationship between two computing resources in accordance with one or more embodiments.

FIG. 10 illustrates an example of a GUI 1000 showing a relationship between two computing resources. In the illustrated example, a computing resource at the geographic location corresponding to the element 1004a is a primary computing resource. A computing resource at the geographic location corresponding to the element 1004d is a backup computing resource for the primary computing resource. The GUI 1000 indicates the existence of the backup computing resource with the element 1006, which includes a dotted line circle and a lighter color. The element 1006 may indicate how many backup computing resources are present: one, in the illustrated example. The GUI 1000 includes a visualization of the relationship between the computing resources at the locations corresponding to elements 1004a and 1004d. The visualization may include an animation, such as an animated dotted line 1008, representing information flow from the computing resource at element 1004a to the computing resource at element 1004d. The visualization may indicate a direction, such as with an arrowhead, or with animation that appears to move in one direction. In some embodiments, the system may show the relationship visualization whenever the geographic map corresponding to a distributed computing resource system is presented. In other embodiments, the system may show the relationship visualization when an element 1004 corresponding to a computing resource having a relationship is selected by a user. In some embodiments, when a primary computing resource becomes unavailable and the backup computing resource becomes the primary computing resource, the visualization may be updated to reflect the change in roles, for example, by reversing an arrowhead, or removing the element that indicated that a computing resource was a backup resource.

Figure 11:
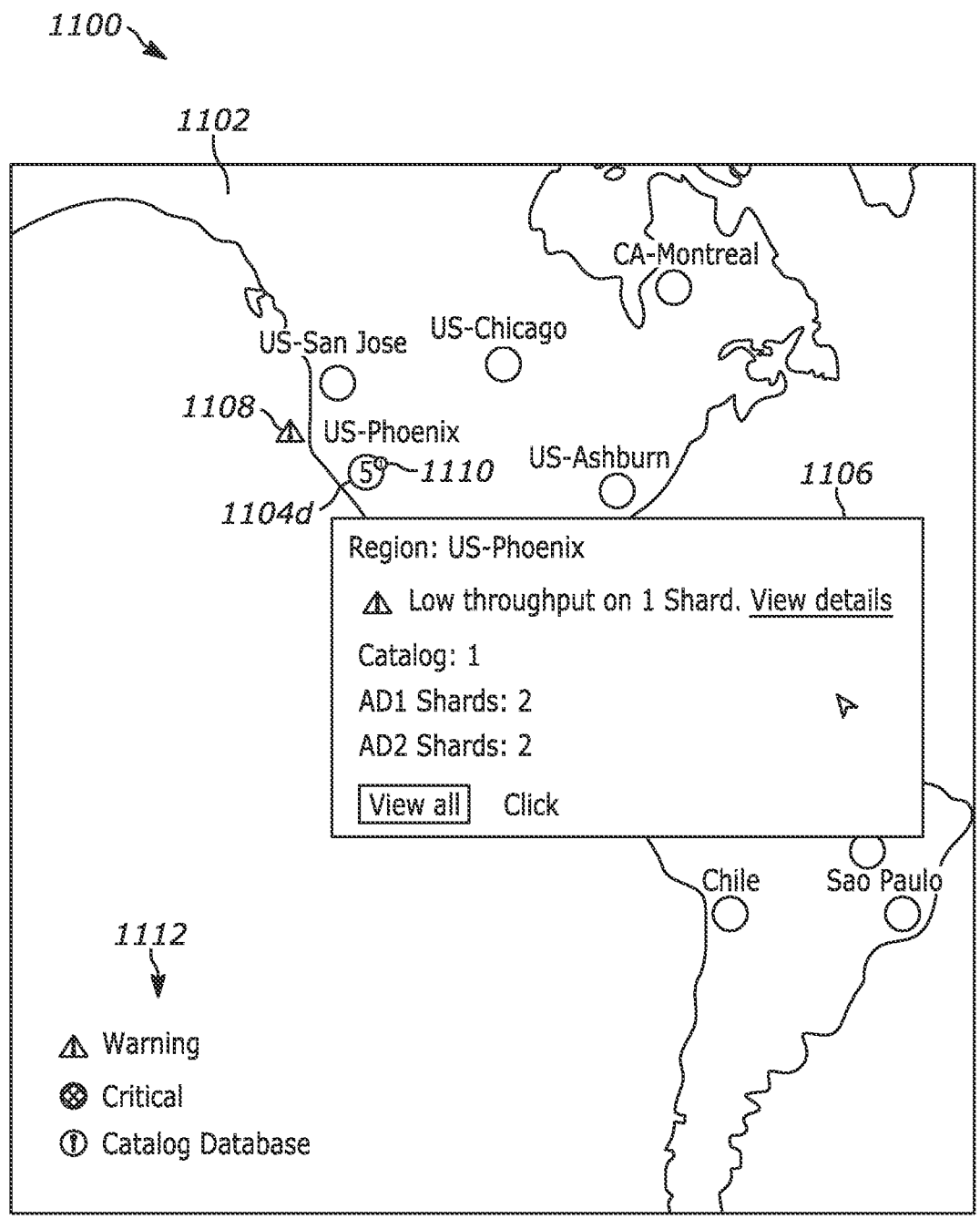
FIG. 11 illustrates a GUI that displays information about a distributed computing resource in accordance with one or more embodiments.

In one or more embodiments, the system retrieves information about a computing resource corresponding to a selected user interface element on the geographic map and presents the information, for example, in a GUI element overlaid on the geographic map. FIG. 11 illustrates an example of a GUI 1100 presenting information about computing resources corresponding to a selected user interface element 1104d. User interface element 1104d shows that there are five computing resources present at the geographic location. When the user selects the element 1104d, for example, by hovering an input device cursor over the element, the system may retrieve information corresponding to the computing resources at the geographic location and present the information in an information window 1106 overlaid on the geographical map 1102. In the illustrated example, the information includes that one of the computing resources has low throughput. The information can include performance metrics associated with the computing resource; a remaining storage capacity of a computing resource; an availability state of a computing resource; a connection status of a computing resource; an error condition at a computing resource; or any other information relating to the function of a computing resource. The information window 1106 may include additional selectable elements that, when selected, present additional information, for example, in a new window or within the same window.

The GUI 1100 may present elements that convey information without the overlaid window 1106. For example, the icon 1108 may indicate, according to a key 1112, that one of the computing resources at the location corresponding to the icon's position has a warning condition. The presence of the icon 1108 on the geographic map display may prompt the user to select the corresponding element 1104d to access the information window 1106. The icon 1110 may indicate that one of the computing resources at the geographic location is a catalog computing resource.

5. Practical Applications, Advantages, and Improvements

The graphical user interfaces described herein improve the user experience when interacting with a distributed resource instance. The geographical map GUI allows the user, e.g., a database administrator, to view a representation of all of the computing resources at their respective locations. The geographic map GUI allows the user to select one or more locations and to access additional GUIs to add, remove, or modify one or more computing resources at the location(s).

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network computing resources. Network computing resources include hardware and/or software configured to execute server processes. Examples of network computing resources include a processor, a data storage, a virtual machine, a container, and/or a software application. Network computing resources are shared amongst multiple clients. Clients request computing services from a computer network independently of each other. Network computing resources are dynamically assigned to the requests and/or clients on an on-demand basis. Network computing resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network computing resources. In PaaS, the service provider provides end users the capability to deploy custom applications onto the network computing resources. The custom applications may be created using programming languages, libraries, services, and tools supported by the service provider. In IaaS, the service provider provides end users the capability to provision processing, storage, networks, and other fundamental computing resources provided by the network computing resources. Any arbitrary applications, including an operating system, may be deployed on the network computing resources.

In an embodiment, various deployment models may be implemented by a computer network, including but not limited to a private cloud, a public cloud, and a hybrid cloud. In a private cloud, network computing resources are provisioned for exclusive use by a particular group of one or more entities (the term "entity" as used herein refers to a corporation, organization, person, or other entity). The network computing resources may be local to and/or remote from the premises of the particular group of entities. In a public cloud, cloud computing resources are provisioned for multiple entities that are independent from each other (also referred to as "tenants" or "customers"). The computer network and the network computing resources thereof are accessed by clients corresponding to different tenants. Such a computer network may be referred to as a "multi-tenant computer network." Several tenants may use a same particular network computing resource at different times and/or at the same time. The network computing resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network computing resource of the multi-tenant computer network is tagged with a tenant ID. A tenant is permitted access to a particular network computing resource if the tenant and the particular network computing resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset if the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application if the tenant ID of the tenant is included in the subscription list corresponding to the particular application.

In an embodiment, network computing resources (such as digital devices, virtual machines, application instances, and threads) corresponding to different tenants are isolated to tenant-specific overlay networks maintained by the multi-tenant computer network. As an example, packets from any source device in a tenant overlay network may be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
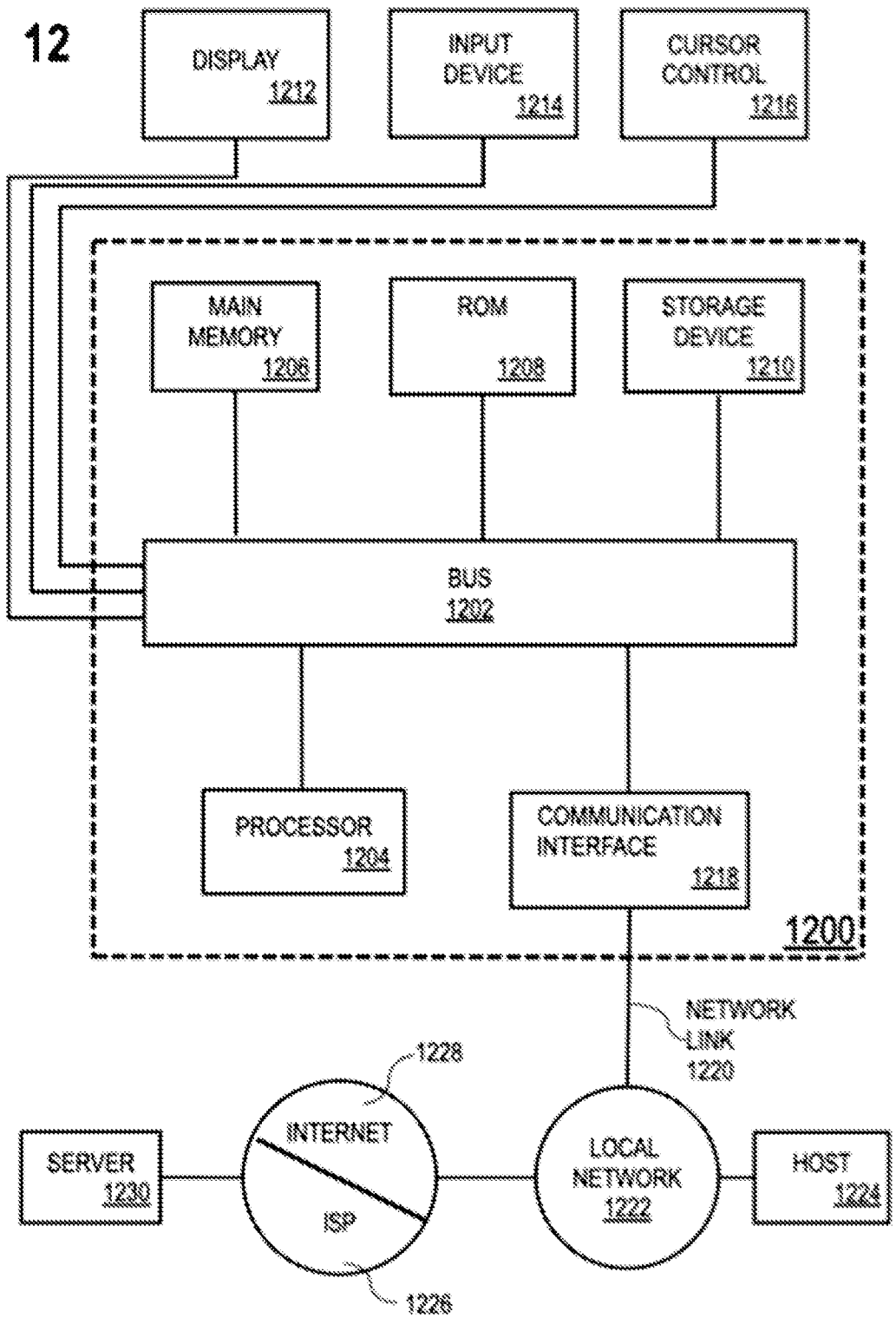
FIG. 12 shows a block diagram that illustrates a computer system in accordance with one or more embodiments.

For example, FIG. 12 is a block diagram that illustrates a computer system 1200 upon which an embodiment of the disclosure may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

8. Miscellaneous; Extensions

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions which, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    presenting an interactive Graphical User Interface (GUI) displaying a geographical map;
    displaying a plurality of user interface elements overlaid on the geographical map,
        wherein each particular user interface element, of the plurality of user interface elements, corresponds to a different particular computing resource of a plurality of computing resources,
        wherein each of the particular user interface elements is displayed at a position on the geographical map that corresponds to a geographical location of physical hardware being used to implement the different particular computing resource;
    receiving a first user input selecting a first user interface element of the plurality of user interface elements, the first user interface element corresponding to a first computing resource of the plurality of computing resources; and
    responsive to receiving the first user input selecting the first user interface element:
        identifying the first computing resource corresponding to the first user interface element and a set of configurable attributes associated with the first computing resource;
        presenting a first resource configuration GUI that displays a set of configuration elements respectively corresponding to the set of configurable attributes associated with the first computing resource;
        receiving, via the first resource configuration GUI, a second user input associated with a configuration element in the set of configuration elements; and
        modifying a configurable attribute in the set of configurable attributes corresponding to the configuration element based on the second user input.

2. The one or more non-transitory computer readable media of claim 1, wherein the operations further comprise:
    receiving a third user input selecting (a) a second user interface element and (b) a third user interface element of the plurality of user interface elements;
    subsequent to receiving the third user input selecting the second user interface element and the third user interface element:
    identifying a second computing resource corresponding to the second user interface element;
    identifying a third computing resource corresponding to the third user interface element; and
    generating and presenting a second resource configuration GUI, the second resource configuration GUI displaying (a) a second set of configurable attributes associated with the second computing resource and (b) a third set of configurable attributes associated with the third computing resource,
    wherein the second resource configuration GUI does not display a fourth set of configurable attributes associated with a fourth computing resource of the plurality of computing resources based on the third user input not selecting a fourth user interface element corresponding to the fourth computing resource.

3. The one or more non-transitory computer readable media of claim 2, wherein the operations further comprise:
    responsive to receiving the third user input selecting the second user interface element and the third user interface element, presenting a configuration-initiation interface element for triggering the second resource configuration GUI; and
    receiving a fourth user input selecting the configuration-initiation interface element, wherein the second resource configuration GUI is generated and presented in response to the fourth user input.

4. The one or more non-transitory computer readable media of claim 1, wherein the operations further comprise:
    responsive to the second user input;
        updating the GUI to display an indication of the modified value of the configurable attribute on the first user interface element on the geographical map.

5. The one or more non-transitory computer readable media of claim 1, wherein the operations further comprise:
    receiving a third user input selecting a second user interface element on the geographical map corresponding to a second computing resource; and
    responsive to receiving the third user input:
        retrieving information corresponding to the second computing resource; and
        presenting the information in a display element associated with the second user interface element.

6. The one or more non-transitory computer readable media of claim 1, wherein the operations further comprise:
  receiving a third user input selecting a second user interface element of the plurality of user interface elements the second user interface element corresponding to a second computing resource of the plurality of computing resources; and
  responsive to receiving the third user input selecting the second user interface element:
    concurrently presenting a computing resource modification GUI overlaid on the geographical map that displays a set of selectable options, each option of the selectable options associated with a respective GUI of a set of GUIs, each GUI operative to execute a different operation in a set of operations on the second computing resource; and
    responsive to receiving a selection of a particular option of the selectable options: presenting the respective GUI corresponding to the particular option.

7. The one or more non-transitory computer readable media of claim 1, wherein the operations further comprise:
  detecting, at runtime, a current relationship between a set of two or more computing resources of the plurality of computing resources; and
  responsive to detecting the current relationship between the set of two or more computing resources of the plurality of computing resources: generating and displaying a visualization, overlaid on the geographical map, that represents the current relationship.

8. The one or more non-transitory computer readable media of claim 7, wherein the set of two or more computing resources comprises a primary storage computing resource and a backup storage computing resource, and wherein the visualization comprises an animation representing a transfer of data from the primary storage computing resource to the backup storage computing resource.

9. The one or more non-transitory computer readable media of claim 7, wherein the set of two or more computing resources comprises a primary storage computing resource and a catalog, and wherein the visualization comprises a visual element indicating the catalog.

10. The one or more non-transitory computer readable media of claim 1, wherein the operations further comprise:
  receiving a third user input, in the first resource configuration GUI, modifying a current location for implementation of the first computing resource to a new location for implementation of the first computing resource; and
  responsive to the third user input:
    implementing the first computing resource on a set of physical hardware located at the new location; and
    updating the GUI to display the first user interface element at a new position on the geographical map that corresponds to the new location.

11. A system comprising:
  one or more hardware processors;
  one or more non-transitory computer-readable media; and
  program instructions stored on the one or more non-transitory computer-readable media that, when executed by the one or more hardware processors, cause the system to perform operations comprising:
    presenting an interactive Graphical User Interface (GUI) displaying a geographical map;
    displaying a plurality of user interface elements overlaid on the geographical map,
      wherein each particular user interface element, of the plurality of user interface elements, corresponds to a different particular computing resource of a plurality of computing resources,
      wherein each of the particular user interface elements is displayed at a position on the geographical map that corresponds to a geographical location of physical hardware being used to implement the different particular computing resource;
    receiving a first user input selecting a first user interface element of the plurality of user interface elements, the first user interface element corresponding to a first computing resource of the plurality of computing resources; and
    responsive to receiving the first user input selecting the first user interface element:
      identifying the first computing resource corresponding to the first user interface element and a set of configurable attributes associated with the first computing resource;
      presenting a first resource configuration GUI that displays a set of configuration elements respectively corresponding to the set of configurable attributes associated with the first computing resource;
      receiving, via the first resource configuration GUI, a second user input associated with a configuration element in the set of configuration elements; and
      modifying a configurable attribute in the set of configurable attributes corresponding to the configuration element based on the second user input.

12. The system of claim 11, wherein the operations further comprise:
  receiving a third user input selecting (a) a second user interface element and (b) a third user interface element of the plurality of user interface elements;
  subsequent to receiving the third user input selecting the second user interface element and the third user interface element:
  identifying a second computing resource corresponding to the second user interface element;
  identifying a third computing resource corresponding to the third user interface element; and
  generating and presenting a second resource configuration GUI, the second resource configuration GUI displaying (a) a second set of configurable attributes associated with the second computing resource and (b) a third set of configurable attributes associated with the third computing resource,
    wherein the second resource configuration GUI does not display a fourth set of configurable attributes associated with a fourth computing resource of the plurality of computing resources based on the third user input not selecting a fourth user interface element corresponding to the fourth computing resource.

13. The system of claim 12, wherein the operations further comprise:
  responsive to receiving the third user input selecting the second user interface element and the third user interface element:
  presenting a configuration-initiation interface element for triggering the second resource configuration GUI; and
  receiving a fourth user input selecting the configuration-initiation interface element, wherein the second resource configuration GUI is generated and presented in response to the fourth user input.

14. The system of claim 11, wherein the operations further comprise:

responsive to the second user input:
  updating the GUI to display an indication of the modified value of the configurable attribute on the first user interface element on the geographical map.

15. The system of claim 11, wherein the operations further comprise:
  receiving a third user input selecting a second user interface element on the geographical map corresponding to a second computing resource; and
  responsive to receiving the third user input:
    retrieving information corresponding to the second computing resource; and
    presenting the information in a display element associated with the second user interface element.

16. The system of claim 11, wherein the operations further comprise:
  receiving a third user input selecting a second user interface element, of the plurality of user interface elements, the second user interface element corresponding to a second computing resource of the plurality of computing resources; and
  responsive to receiving the third user input selecting the second user interface element:
    concurrently presenting a computing resource modification GUI overlaid on the geographical map that displays a set of selectable options, each option of the selectable options associated with a respective GUI of a set of GUIs, each GUI operative to execute a different operation in a set of operations on the second computing resource; and
  responsive to receiving a selection of a particular option of the selectable options: presenting the respective GUI corresponding to the particular option.

17. The system of claim 11, wherein the operations further comprise:
  detecting, at runtime, a current relationship between a set of two or more computing resources of the plurality of computing resources; and
  responsive to detecting the current relationship between the set of two or more computing resources of the plurality of computing resources: generating and displaying a visualization, overlaid on the geographical map, that represents the current relationship.

18. The system of claim 11, wherein the operations further comprise:
  receiving a third user input, in the first resource configuration GUI, modifying a current location for implementation of the first computing resource to a new location for implementation of the first computing resource;
  responsive to the third user input:
  implementing the first computing resource on a set of physical hardware located at the new location; and
  updating the GUI to display the first user interface element at a new position on the geographical map that corresponds to the new location.

19. A method comprising:
  presenting an interactive Graphical User Interface (GUI) displaying a geographical map;
  displaying a plurality of user interface elements overlaid on the geographical map,
    wherein each particular user interface element, of a plurality of user interface elements, corresponds to a different particular computing resource of a plurality of computing resources,
    wherein each of the particular user interface elements is displayed at a position on the geographical map that corresponds to a geographical location of physical hardware being used to implement the different particular computing resource;
  receiving a first user input selecting a first user interface element of the plurality of user interface elements, the first user interface element corresponding to a first computing resource of the plurality of computing resources; and
  responsive to receiving the first user input selecting the first user interface element:
    identifying the first computing resource corresponding to the first user interface element and a set of configurable attributes associated with the first computing resource;
    presenting a first resource configuration GUI that displays a set of configuration elements respectively corresponding to the set of configurable attributes associated with the first computing resource;
    receiving, via the first resource configuration GUI, a second user input associated with a configuration element in the set of configuration elements; and
    modifying a configurable attribute in the set of configurable attributes corresponding to the configuration element based on the second user input;
  wherein the method is performed by at least one device including a hardware processor.

20. The method of claim 19, further comprising:
responsive to the second user input:
updating the GUI to display an indication of the modified value of the configurable attribute on the first user interface element on the geographical map.

21. The method of claim 19, further comprising:
receiving a third user input selecting (a) a second user interface element and (b) a third user interface element of the plurality of user interface elements;
subsequent to receiving the third user input, selecting the second user interface element and the third user interface element:
identifying a second computing resource corresponding to the second user interface element;
identifying a third computing resource corresponding to the third user interface element; and
generating and presenting a second resource configuration GUI, the second resource configuration GUI displaying (a) a second set of configurable attributes associated with the second computing resource and (b) a third set of configurable attributes associated with the third computing resource,
wherein the second resource configuration GUI does not display a fourth set of configurable attributes associated with a fourth computing resource of the plurality of computing resources based on the third user input not selecting a fourth user interface element corresponding to the fourth computing resource.

22. The method of claim 21, further comprising:
responsive to receiving the third user input selecting the second user interface element and the third user interface element, presenting a configuration-initiation interface element for triggering the second resource configuration GUI; and
receiving a fourth user input selecting the configuration-initiation interface element, wherein the second resource configuration GUI is generated and presented in response to the fourth user input.

23. The method of claim 19, further comprising:
receiving a third user input selecting a second user interface element on the geographical map corresponding to a second computing resource; and responsive to receiving the third user input:
   retrieving information corresponding to the second computing resource; and
   presenting the information in a display element associated with the second user interface element.

24. The method of claim 19, further comprising:
receiving a third user input selecting a second user interface element of the plurality of user interface elements the second user interface element corresponding to a second computing resource of the plurality of computing resources; and
responsive to receiving the third user input selecting the second user interface element:
concurrently presenting a computing resource modification GUI overlaid on the geographical map that displays a set of selectable options, each option of the selectable options associated with a respective GUI of a set of GUIs, each GUI operative to execute a different operation in a set of operations on the second computing resource; and
responsive to receiving a selection of a particular option of the selectable options: presenting the respective GUI corresponding to the particular option.

25. The method of claim 19, further comprising:
detecting, at runtime, a current relationship between a set of two or more computing resources of the plurality of computing resources; and
responsive to detecting the current relationship between the set of two or more computing resources of the plurality of computing resources: generating and displaying a visualization, overlaid on the geographical map, that represents the current relationship.

26. The method of claim 25, wherein the set of two or more computing resources comprises a primary storage computing resource and a backup storage computing resource, and wherein the visualization comprises an animation representing a transfer of data from the primary storage computing resource to the backup storage computing resource.

27. The method of claim 25, wherein the set of two or more computing resources comprises a primary storage computing resource and a catalog, and wherein the visualization comprises a visual element indicating the catalog.

28. The method of claim 19, further comprising:
receiving a third user input, in the first resource configuration GUI, modifying a current location for implementation of the first computing resource to a new location for implementation of the first computing resource;
responsive to the third user input:
   implementing the first computing resource on a set of physical hardware located at the new location; and
   updating the GUI to display the first user interface element at a new position on the geographical map that corresponds to the new location.

* * * * *